(No Model.)

S. H. EVERETT.
FERTILIZER DISTRIBUTER.

No. 439,495. Patented Oct. 28, 1890.

on line 2-2

Witnesses:

Inventor:
S. H. Everett
By Phil. T. Dodge Atty.

UNITED STATES PATENT OFFICE.

SAMUEL H. EVERETT, OF MACEDON, NEW YORK, ASSIGNOR TO HELEN M. KIRKPATRICK, OF SAME PLACE.

FERTILIZER-DISTRIBUTER.

SPECIFICATION forming part of Letters Patent No. 439,495, dated October 28, 1890.

Application filed May 20, 1890. Serial No. 352,530. (No model.)

*To all whom it may concern:*

Be it known that I, SAMUEL H. EVERETT, of Macedon, in the county of Wayne and State of New York, have invented certain Improvements in Fertilizer-Distributers, of which the following is a specification.

This invention relates to that class of distributers in which a horizontally-revolving wheel provided with radial teeth is arranged to carry the material from the base of the hopper over a bottom plate and under an overlying cut-off plate to a discharge-opening behind the latter, as shown, for example, in Letters Patent of the United States granted to me on the 9th day of December, 1879, No. 222,478, and the 15th day of February, 1881, No. 237,843.

The aims of the invention are to provide a simple means of adjusting the apparatus to distribute at different rates of speed or for the distribution of different kinds of material, to prevent the material from finding its way into the wearing joints, and to insure the discharge of the material.

Figure 1:
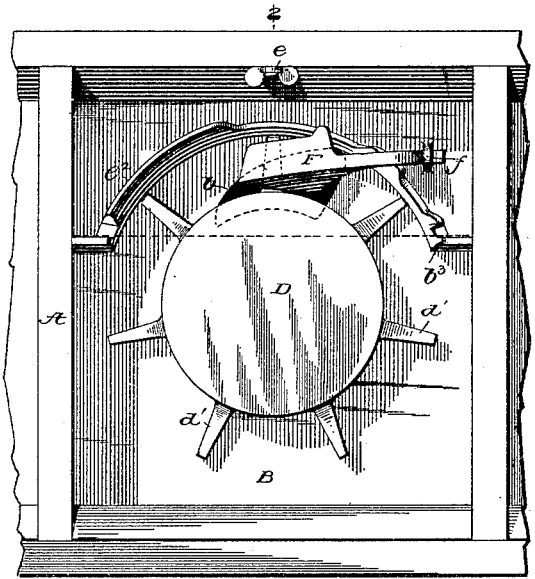
Figure 2:
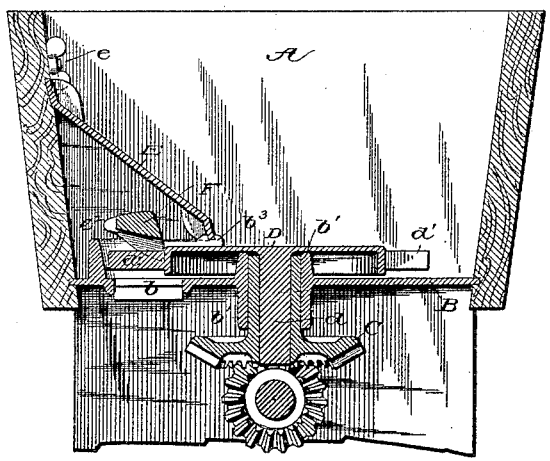
Figure 3:
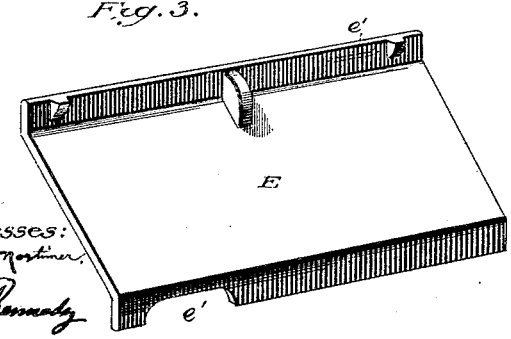
Figure 4:
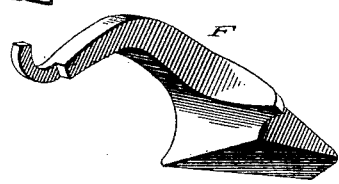

In the accompanying drawings, Figure 1 is a top plan view of a portion of a hopper containing one of my distributers, the cut-off plate being removed. Fig. 2 is a vertical cross-section of the same on the line 2 2. Fig. 3 is a perspective view of the cut-off plate. Fig. 4 is a perspective view of the knocker or clearer.

Referring to the drawings, A represents the hopper, and B a horizontal bottom plate fixed in position thereon and provided near one edge with an opening $b$, through which the material is discharged. The bottom plate is formed with a tubular central hub or bearing $b'$, which extends both above and below the plate, as shown.

C is a horizontal driving-gear having a tubular hub or sleeve extended upward within the bearing of the bottom plate.

D is the horizontal feed-wheel overlying the bottom plate and having a central driving-stud $d$ extended down within the hub of the driving-wheel, with which it interlocks in the ordinary manner. The feed-wheel is recessed in the under side to fit down over and around the elevated bearing that its lower edge may travel close to the surface of the bottom plate. At the outer edge the wheel is provided with radial arms or fingers $d'$, which, sweeping over the bottom plate, carry the material horizontally to the discharge-opening. It is to be noticed that the hub $b'$ is extended to such height that it bears against the under side of the feed-wheel and sustains the same with its peripheral flange just clear of the bottom plate. This central support permits the wheel to be turned easily, and at the same time it provides an elevated tight joint to prevent the fertilizer from working down between the wearing-surfaces.

E represents the cut-off plate arranged in an inclined position in one side of the hopper in position to cover the feed-opening and one side of the wheel. This plate, which bears at its upper edge against the side wall of the hopper and which stands at the lower edge in close proximity to the top of the wheel, serves to prevent the direct discharge of the material to the discharge-opening and to control the rate of delivery to the opening by the fingers of the wheel. In its general arrangement and mode of action it is substantially the same as that shown in my patent, No. 237,843. It differs, however, from the original plate in that instead of being secured fast to the side wall of the hopper it is seated at the lower edge on supporting-lugs $b^3$ on the base-plate and confined at its upper edge by a button or equivalent fastening device $e$, so that it may be released and inverted in order to bring the lower or the upper edge into operative relation to the wheel. The two edges are made of different forms, as shown in Fig. 3, one edge being unbroken or continuous, while the other is provided with a notch or depression $e'$, which, overlying the teeth of the wheel, will permit the increased flow of material to the discharge-opening, and thus increase the rate of delivery. Both edges may be notched, if desired, as indicated in dotted lines, the notch in one edge being of different size from that in the other.

The essence of my invention resides in the employment of a reversible plate the edges of which differ in form in such manner that the rate of feed may be varied by bringing one edge or the other next to the wheel. The manner of supporting the lower edge of the plate and of securing the upper edge are not of the essence of my invention, and may be modified within the range of mechanical skill.

In order to insure the delivery of the material through the discharge-opening, I provide a gravitating knocker or clearer F, one end of which is hooked through an eye $f$, cast on the base-plate, while the other end is beveled and arranged above the outlet-opening in position to be lifted and permitted to fall by the successive teeth passing thereunder. It will be observed that this knocker is cast complete in one piece, and that an eye to receive its hooked or bent end is cast integral with the base-plate. It is guided and prevented from playing laterally by the circular flange $e^2$, which rises from the base-plate, and which is notched vertically to receive the knocker.

Having thus described my invention, what I claim is—

1. In a fertilizer-feeder, the base-plate provided with a feed-opening and the horizontal toothed feed-wheel, in combination with the reversible cut-off plate having variant edges.

2. The bottom plate provided with the discharge-opening and the studs $b^3$, the combination of the horizontal feed-wheel and the reversible cut-off plate sustained at its lower edge by the studs and secured at its upper edge by a button or like fastening, as described and shown.

3. In a fertilizer-feeder, and in combination with a feed-wheel, an overlying cut-off the edges of which differ in form, said plate adapted to be turned to bring one or another of its edges into operative relation to the wheel at will.

4. In combination with the feed-wheel with the depending peripheral flange, the bed-plate having the tubular hub extended upward to bear against the wheel and sustain the same with its flange clear of the plate, whereby the wheel is permitted to turn easily, and leakage at the center prevented.

In testimony whereof I hereunto set my hand, this 9th day of May, 1890, in the presence of two attesting witnesses.

SAMUEL H. EVERETT.

Witnesses:
WILLIAM P. THISTLETHWAITE,
CHAS. J. THISTLETHWAITE.